UNITED STATES PATENT OFFICE.

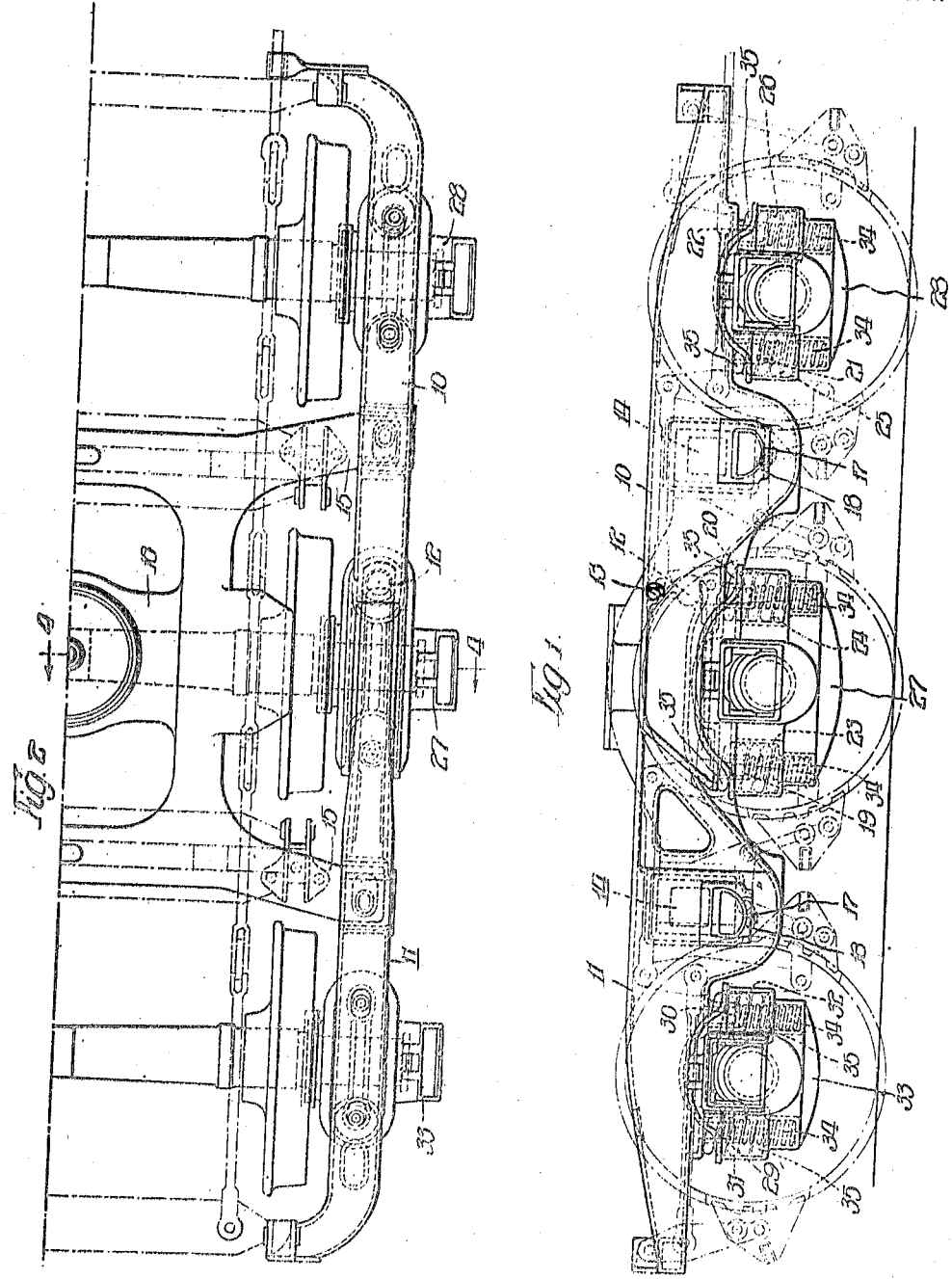

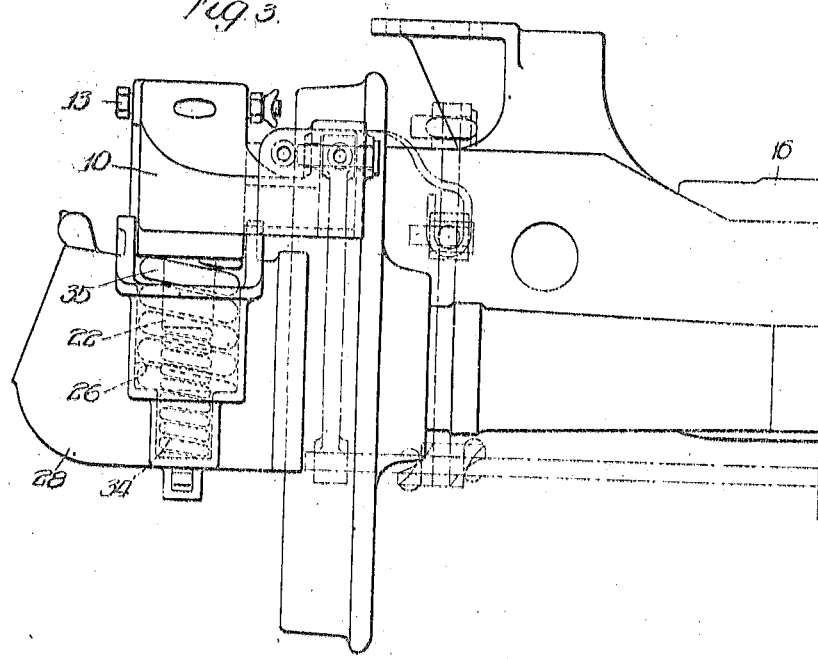
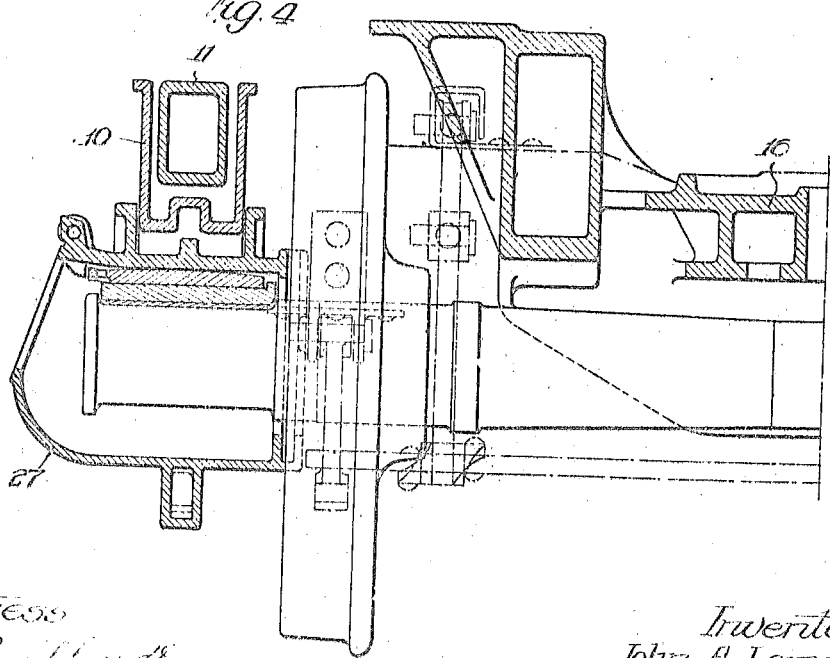

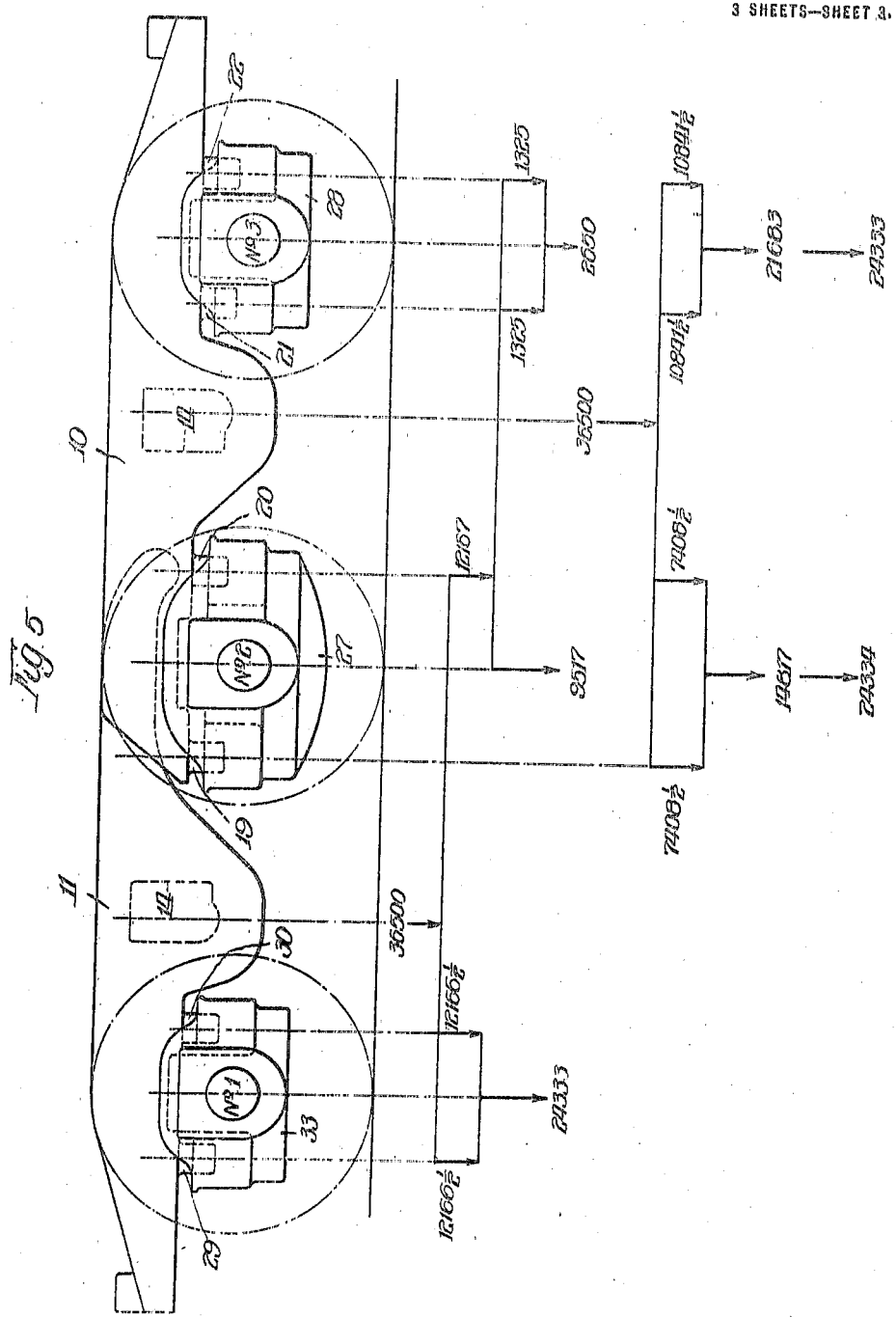

JOHN A. LAMONT, OF CHICAGO, ILLINOIS, ASSIGNOR TO AMERICAN STEEL FOUNDRIES, OF CHICAGO, ILLINOIS, A CORPORATION OF NEW JERSEY.

TRUCK CONSTRUCTION.

1,377,698.          Specification of Letters Patent.          Patented May 10, 1921.

Application filed September 20, 1920. Serial No. 411,601.

*To all whom it may concern:*

Be it known that I, JOHN A. LAMONT, a citizen of the United States, residing at Chicago, in the county of Cook and State of Illinois, have invented certain new and useful Improvements in Truck Constructions, of which the following is a specification.

This invention relates to truck constructions.

One object of the invention is to provide a simple, compact and efficient railway car truck, the sides frames of which are articulated to take curved tracks, both horizontal and vertical, without distorting parts, and coöperating with the truck bolsters and journal boxes in a manner to meet all of the requirements under service conditions.

Another object is to provide a truck construction wherein the wheel base is reduced to a minimum consistent with good operation.

Another object is to provide a truck arrangement in which the loads transmitted through the side frames are distributed to the journal boxes in a new and improved manner and adapted to meet all requirements.

These and other objects are accomplished by means of the arrangement disclosed on the accompanying sheets of drawings, in which—

Figure 1 is a side elevation of a railway car truck embodying my invention;

Fig. 2 is a fragmentary top plan view of the same;

Fig. 3 is a fragmentary end elevation of the same car truck;

Fig. 4 is a sectional view taken in the plane of line 4—4 of Fig. 2; and,

Fig. 5 is a diagrammatic view of a truck side frame and journal boxes indicating the load distribution.

The various novel features of my invention will be apparent from the following description and drawings and will be particularly pointed out in the appended claims.

The invention is disclosed particularly in connection with a six-wheel truck in which each of the side frames includes a rigid side frame member 10 and a flexible frame member 11 which are pivotally connected to each other at the point 12 for relative vertical movement, and also connected to each other on a vertical axis, as shown in detail in my copending application, Serial No. 411,603, filed September 20, 1920, whereby the side frames have relative lateral movement. Locking means in the form of a bolt 13 is provided which normally prevents the side frame members 10 and 11 from becoming disconnected from each other, especially when the same are turned over by accident in leaving the track. Each of the side frame members has a bolster opening 14 for the reception of an associated arm 15 of an integrally formed bolster 16, each of said bolster arms 15 terminating in an eccentrically arranged rocker bearing portion 17 whereby the bolster arms may have a relative rocking movement with respect to the associated side frame members. Preferably each of the rocker members 17 is mounted in a bolster pivot member 18 having pivotal connection with the associated side frame members on a vertical axis, whereby there is certain freedom of movement between the bolster arms and side frames, such as in rounding a curve. The rocker bearing members 17 find particular value when the truck encounters a vertically curved track, such as a switch-back. The bearing portions 17 of the bolster arms 15 are made eccentric with respect thereto, particularly for the purpose of placing the bearing members as closely to the associated outer or end journal bearings as possible in order that the wheel base may be made as short as possible. In this same connection it will be noted that the inner ends of the side frame members 10 and 11 are telescopically arranged, the inner end of the flexible frame member 11 being located within the walls of the inner end of the fixed side frame member 10.

The fixed side frame member 10 is provided with a plurality of integrally formed dowel projections or pins 19, 20, 21 and 22 for passing into openings or spring pockets 23 and 24, and 25 and 26, of two journal boxes 27 and 28, respectively. In a similar manner, the flexible side frame member 11 is provided with two integrally formed dowel pins or projections 29 and 30, which, respectively, pass into spring pockets 31 and 32 of an associated journal bearing box 33. Each of these journal boxes has mounted in each of its pockets two springs, a light spring 34 and a heavy spring 35, said springs being arranged concentrically with respect to each other. The upper end of the lighter spring is engaged by the lower end of the associated dowel pin or projection in each case, and another portion of the side frame rests upon and engages each of the heavier coiled springs 35. The top of the light coiled spring 34 is considerably below the top of the heavier coiled spring 35, whereby the dowel pin or projection in each case in resting upon the top of the associated coiled spring, is inclosed within the upper end of the associated heavy coiled spring, which is located within the journal box, and whereby relative lateral movement between the side frame member and the journal box in each case is limited. It will be noted that the spring pockets of each of the journal boxes is located on opposite sides of the centrally-arranged journal-receiving portion in each case, the journal box in the center of the truck being larger than the journal boxes at the ends of the truck. By placing the springs between the journal boxes and side frame members and having the bolster directly engage the side frame members the total dead weight supported on springs is greatly increased.

In connection with the overlapping arrangement of the truck side frame members 10 and 11, it will be noted that the inner end of the fixed side frame member 10 exerts a pressure upon both sides of the centrally-arranged journal box through the springs mounted in said box, and that the inner end of the flexible side frame member 11 transmits its load through the fixed side frame member 10 to the springs in the central journal box 27. A portion of the load which is transmitted from the flexible side frame member 11 to the fixed side frame 10 is transmitted through the latter to the end journal box 28 of the fixed side frame member, it being understood, of course, that a part of the load exerted on the flexible side frame member 11 is transmitted to its end journal box 33.

Referring particularly to Fig. 5, the load distribution will be observed. Assuming that a load of 36,500 pounds is exerted upon the flexible side frame member 11 at the left bolster opening 14, two-thirds of the load, or 24,333 pounds, will be transmitted to journal No. 1 equally through the springs in the pockets on opposite sides of the journal No. 1. One-third, or 12,167 pounds, of the load from flexible side frame member 11 will be transmitted to the fixed side frame member 10 and to middle journal No. 2, and also end journal No. 3. This load to journals Nos. 2 and 3 will be divided, 9,517 to journal No. 2 and 2,650 to journal No. 3, the latter being transmitted in equal parts through the springs on opposite sides of the journal No. 3. It is seen, therefore, that the load transmitted from the bolster through the flexible side frame member 11 will be distributed through each of the three journal boxes to the three journals of said side frame. The load transmitted to the fixed side frame 10 from the right bolster arm directly associated with said side frame member 10 being 36,500 pounds, is distributed in the following manner: 21,683 to journal No. 3 and 14,817 pounds through journal No. 2, in each case the load being divided between the springs on opposite sides of the respective journals. In summing up the loads impressed upon each of the journals, it will be noted that journals No. 1 and No. 3 each take a load of 24,333 pounds, the middle journal No. 2 taking a load of 24,334 pounds, or, in other words, the load transmitted to each of the journals is substantially the same.

It is my intention to cover all modifications of the invention falling within the spirit and scope of the following claims.

I claim:

1. In a six-wheel truck, the combination of an articulated side frame having overlapping frame members, a plurality of journal boxes associated with said frame members, one of said journal boxes being located at the overlapping portions of said frame members with the inner ends of said frame members transmitting loads to opposite sides of said one journal box whereby loads on all journal boxes are divided substantially equally, and resilient means interposed between said one journal box and said frame members for increasing the total amount of dead load resiliently supported.

2. In a six-wheel truck, the combination of an articulated side frame having overlapping frame members, three journal boxes associated with said frame members, the intermediate one of said journal boxes being located at the overlapping portions of said frame members with the inner ends of said frame members transmitting loads to opposite sides of said intermediate journal box whereby loads on all journal boxes are divided substantially equally, and resilient means interposed between said journal boxes and side frame members for increasing the total amount of dead load resiliently supported.

3. In a six-wheel truck, the combination of an articulated side frame including a plurality of frame members, a bolster directly engaging said frame members, and a journal box associated with each frame member, said frame members being arranged whereby a load on one of said frame members is transmitted to all journal boxes associated with said side frame members, and resilient means interposed between said journal boxes and said frame members for increasing the total amount of dead load resiliently supported.

4. In a truck, the combination of an articulated side frame including a plurality of frame members, a journal box associated with each frame member, said frame members being arranged whereby a load on one of said frame members is transmitted to all journal boxes associated with said side frame, and resilient means interposed between said journal boxes and said frame members for increasing the total amount of dead load resiliently supported.

5. In a railway truck, a side frame having integrally formed dowel pins, and a journal box having spring pockets therein for receiving said dowel pins for limiting movement of the side frame with respect to said journal box.

6. In a railway truck, a side frame having integrally formed dowel pins, and a journal box having spring pockets therein for receiving said dowel pins for limiting lateral movement of the side frame with respect to said journal box.

7. In a railway car truck, the combination of a side frame having projections, a journal box having a plurality of spring pockets, and springs mounted in said pockets, said side frame projections each resting upon one of said springs and being located within the other for limiting relative lateral movement between the said frames and journal box.

8. In a railway car truck, the combination of a side frame, and a bolster having arms with eccentrically-arranged roller bearing portions to permit a relative rocking movement between the side frames and bolster arms.

9. In a railway truck, the combination of a side frame, and a bolster having eccentrically arranged rocker bearing portions coöperating with said side frame for permitting a relative rocking motion therebetween.

Signed at Chicago, Illinois, this 10th day of September, 1920.

JOHN A. LAMONT.